United States Patent [19]
Amos

[11] Patent Number: 5,831,241
[45] Date of Patent: Nov. 3, 1998

[54] OPTIMIZED WELDING TECHNIQUE FOR NIMOV ROTORS FOR HIGH TEMPERATURE APPLICATIONS

[75] Inventor: Dennis Ray Amos, Rock Hill, S.C.

[73] Assignee: Westinghouse Electric Corporation, Pittsburgh, Pa.

[21] Appl. No.: 778,607

[22] Filed: Jan. 6, 1997

Related U.S. Application Data

[63] Continuation-in-part of Ser. No. 398,182, Mar. 2, 1995, Pat. No. 5,591,363.

[51] Int. Cl.⁶ ..................................................... B23K 9/04
[52] U.S. Cl. ................................ 219/137 PS; 29/889.21; 219/76.12
[58] Field of Search ......................... 219/137 PS, 137 R, 219/76.12, 76.14, 76.15; 29/889.1, 889.2, 889.21

[56] References Cited

U.S. PATENT DOCUMENTS

| | | |
|---|---|---|
| 4,633,554 | 1/1987 | Clark et al. ........................ 219/137 R |
| 4,893,388 | 1/1990 | Amos et al. ........................ 29/156.8 R |
| 4,897,519 | 1/1990 | Clark et al. ........................... 219/76.14 |
| 4,903,888 | 2/1990 | Clark et al. ............................... 228/119 |
| 4,940,390 | 7/1990 | Clark et al. ........................... 416/241 R |
| 4,958,431 | 9/1990 | Clark et al. ............................. 29/889.1 |
| 5,024,582 | 6/1991 | Bellows et al. ......................... 29/889.2 |

FOREIGN PATENT DOCUMENTS 2122613  11/1972  Germany.

*Primary Examiner*—Clifford C. Shaw
*Attorney, Agent, or Firm*—D. G. Maire

[57] ABSTRACT

A welding process of repairing a ferrous NiMoV low alloy steel turbine component. A first and a second layer of weld material are welded to the turbine component at electrical current levels chosen so as to prevent a substantial decrease and a substantial increase in the hardness of the component. This method involves selecting these electrical current levels. Additionally, this invention relates to selecting appropriate electrical current levels that minimizes the difference between a maximum and a minimum level of hardness while welding a first and a second layer of weld material. This invention also includes a method for preventing a substantial decrease in the hardness of the component as a result of the welding process.

20 Claims, 4 Drawing Sheets

OPTIMIZED WELDING TECHNIQUE FOR NIMOV ROTORS FOR HIGH TEMPERATURE APPLICATIONS

This is a continuation-in-part of commonly assigned co-pending patent application Ser. No. 08/398,182 issued Mar. 2, 1995, presently scheduled to issue as U.S. Pat. No. 5,591,363 on Jan. 7, 1997.

FIELD OF THE INVENTION

The present invention relates to methods for repairing ferrous Nickel Molybdenum Vanadium ("NiMoV") low alloy steel steam turbine components, in particular, creep damaged or corroded surface sections of ferrous NiMoV low alloy steel steam turbine components that are subject to high temperature environments.

BACKGROUND OF THE INVENTION

In the 1950's, the power generation industry widely used ferrous NiMoV to make Low pressure ("LP") and High Pressure ("HP") Steam turbine components, such as rotors. This NiMoV material is similar to either American Society of Testing Material (ASTM) 293 class 2, 3, 4, or 5 material. Steam turbine components, including rotors, are not currently made of ferrous NiMoV alloy because this material exhibits inferior elevated temperature properties as compared to other ferrous low alloy steels such as Chromium Molybdenum Vanadium ("CrMoV").

Nevertheless, turbine components comprised of ferrous NiMoV low alloy steel are still in service in the field of power generation, some in operation for over 30 years. Due to prolonged use, NiMoV alloy turbine components, in particular, the surfaces of HP turbine rotors, may become creep damaged, mechanically damaged or corroded. Rather than replacing an entire turbine rotor, for example, the damaged sections of the rotors are generally repaired. A welding process is commonly used to perform repairs of rotors. Welding processes are generally economical and have been effective at extending the operating life of rotors.

For example, single rotor blade groove fasteners, known as steeples or fingered blades attached with pins, commonly require repair. Over time, especially in HP environments, the steeples or pin holes are subject to creep, corrosion, pitting, etc. . . . It is common to machine down creep damaged, corroded steeples or pin holes. Then, weld metal is deposited onto the machined surface of the rotor. Finally, the build-up of weld metal is machined to form new or repaired blade attachments. This process does not work well, however, for repairing blade attachments on ferrous NiMoV low alloy steel HP turbine component. Known welding processes have been found to weaken the heat affected ferrous NiMoV low alloy steel adjacent to the weld fusion zone making the components unusable in high pressure and elevated temperature environments.

In detail, filler or weld metal is deposited onto a creep damaged or corroded area/surface of the rotor by fusing the filler or weld metal with the surface. Gas tungsten arc welding ("GTAW"), plasma-arc welding, electron beam welding, laser-beam welding, submerged arc welding or gas metal arc welding may be used to deposit the weld metal. See, for example U.S. Pat. Nos. 4,893,388, 4,897,519, 4,903,888, 4,940,390 and 4,958,431 which are assigned to the assignee of this application (these patents teach either retrofitting ferrous rotors or repairing and replacing creep damaged steeples and other damaged areas on the surface of ferrous CrMoV low alloy steel steam turbine components such as rotors and are hereby incorporated by reference for their teachings on methods of repair and welding techniques).

The first layer of weld metal deposited on the surface of a turbine component fuses with the surface of the component. The area or line between the fusion zone and base metal of a turbine component is known as the fusion line. GTAW is commonly used to deposit the first layer of weld metal. The GTAW process uses an arc to fuse the weld metal to the turbine component. The arc also elevates the temperature of the base metal in the area adjacent to the fusion line.

Consequently, the microstructure and mechanical property of the base metal in this area are significantly changed. This area is known as the Heat Affected Zone ("HAZ"). A portion of the metal in this area is reaustenitised and dramatically cooled due to the welding thermal cycle causing the metal to be hardened creating a hardened sub-zone of the HAZ. The metal closest to the point of fusion is generally subject to the greatest level of hardening. On the other hand, a portion of the metal in this area is tempered during the welding thermal cycle causing the metal to be softened. This softened sub-zone of the HAZ is located farther away from the point of fusion line than the hardened sub-zone.

Using normal process of depositing layers of weld metal, it has been found that the level of hardness of ferrous NiMoV low alloy steel around the fusion line in the HAZ can be as high as 50 on a Rockwell "C" scale ("Rc"), however, the level of hardness of the softened sub-zone can be as low as 240 on a Knoop scale ("HK") (18 Rc). The normal level of hardness of ferrous NiMoV low alloy steel of a turbine component is approximately 25 Rc. Ferrous NiMoV low alloy steel with a level of hardness of 50 Rc is highly suspectable to cracking. Ferrous NiMoV low alloy steel with a level of hardness of 18 Rc has very low elevated temperature strength and very low creep resistance.

In order to relieve welding thermal induced stress and the level of hardness of the HAZ, the weld area is normally heat treated after the deposition of the layers of weld metal (postweld). In particular, ferrous NiMoV turbine components are normally heat treated at a temperature of about 1200° F. (649° C.) for ten hours. After this postweld heat treatment, the level of hardness of the ferrous NiMoV low alloy steel around the fusion line in the HAZ is reduced, in some cases as low 36 Rc. It has been found that the level of hardness of the low alloy steel around the fusion line can be further reduced by using higher temperatures during the postweld treatment. Higher temperatures, however, may produce carbide coarsening or over tempering of low alloy steel in the HAZ that was not hardened or reaustenitised, i.e., softened sub-zone, during the welding process.

Over tempering further aggravates the softened sub-zone in HAZ of the low alloy steel, i.e., it further reduces the level of hardness of the softened sub-zone below the normal level of ferrous NiMoV low alloy steel; i.e., 16 Rc. This lowers the creep strength of the low alloy steel making the turbine component unusable in high pressure/temperature applications. As a consequence, it is not common to repair ferrous NiMoV low alloy steel turbine components used in HP environments using welding processes. Thus, a need exists for a repair process for worn or damaged ferrous NiMoV low alloy steel steam turbine components, such as rotors used in HP environments. In particular, a process that does not substantially affect the level of hardness of the ferrous NiMoV low alloy steel turbine component.

SUMMARY OF THE INVENTION

According to the present invention, a method of repairing a surface of a ferrous NiMoV low alloy metal steam turbine component includes welding at least a first and a second layer of weld material to the component. Additional layers may also be welded to the component and preferably at least eleven more layers are welded to the component. Each layer is welded to prevent a substantial increase and a substantial decrease in the hardness of the component and to minimize the difference between a maximum level of hardness and a minimum level of hardness of the component. More specifically, each of these weld layers is deposited at a predetermined or selected electrical current level that achieves this effect.

Preferably, the first layer of weld material is deposited at an electrical current level of about 150 amperes, and the second layer is deposited at about 250 amperes. Additionally, the welding technique utilized is typically gas tungsten arc welding. By selecting these electrical current levels, the maximum hardness level of the component does not exceed about 353 HK, the minimum hardness level of the component is greater than or equal to about 280 HK and the difference between the maximum and minimum hardness levels does not exceed about 73 HK.

DETAILED DESCRIPTION OF THE PREFERRED EMBODIMENTS

Figure 1:
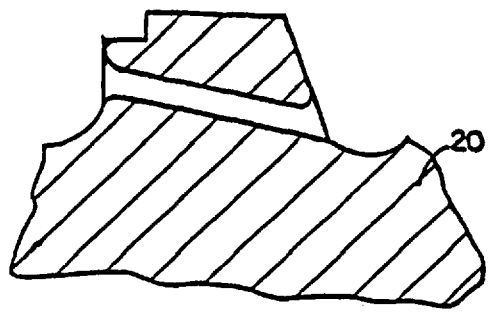
FIG. 1 (Prior Art) is a cross-sectional view of a rotor wherein the old blade attachments have been machined off.
Figure 2:
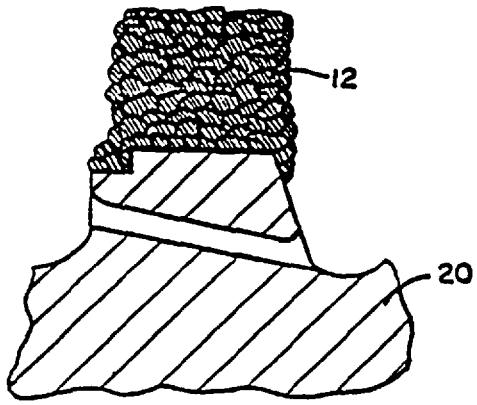
FIG. 2 (Prior Art) is a cross-sectional view of the rotor of FIG. 1, illustrating a weld build-up disposed on the machined surface.

FIGS. 1–5 (Prior Art) illustrate the formation of new blade attachments on steam turbine components 20, 40, and 50 using weld metal build-up processes. In detail, first, old or worn blade attachments are machined off using any of know procedures for removing metal such as grinding, machining, or electric arc gouging. FIG. 1 depicts a cross section of a rotor 20 where a blade attachment has been machined off. It will be appreciated that the rotor depicted in FIG. 1 is circular, and the illustrated blade attachment runs 360° around the circumference of the rotor. Next, layers of weld metal are deposited onto the surface of the rotor. The present invention provides a preferred process for depositing layers of weld metal onto a ferrous NiMoV low alloy steel turbine component. FIG. 2 depicts the rotor 20 shown in FIG. 1 after several layers of weld metal 12 have been deposited on the surface of the rotor. Although FIG. 2 indicates weld material 12 below the top surface of the rotor, weld material is not always placed below this top surface. Rather, the weld material 12 may be deposited only on the outermost surface of the rotor.

Figure 3:
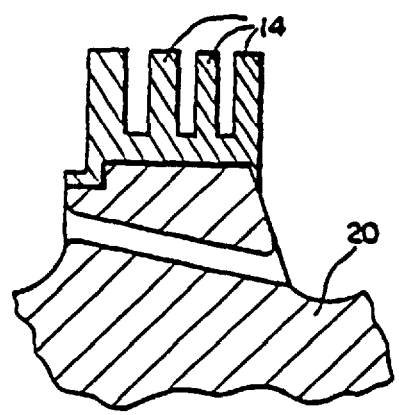
FIG. 3 (Prior Art) is a partial, cross-sectional view of the rotor of FIG. 2, illustrating machined and repaired blade attachments.
Figure 4:
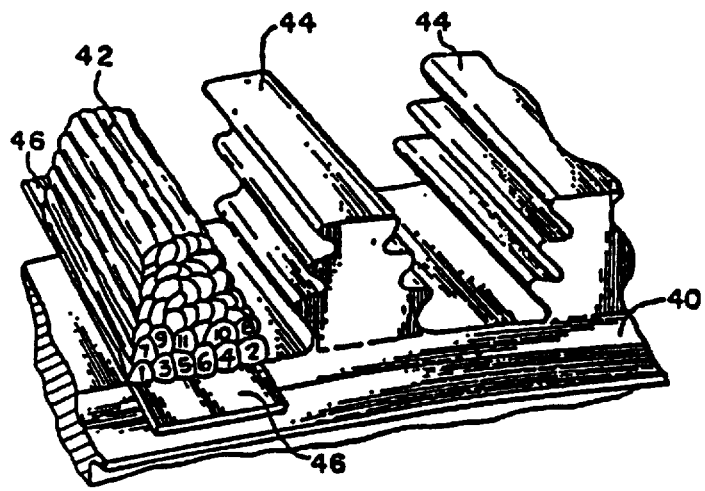
FIG. 4 (Prior Art) is a partial perspective of a single steeple repair technique, illustrating the use of run-off tab plates and bead-sequencing.

At this point, the build-up of weld metal 12 may be machined into the shape or configuration of the original blade attachment or other segment of the surface of the rotor 20 or turbine component that is being replaced or repaired. FIG. 3 depicts the rotor 20 with build-up of weld metal 12 shown in FIG. 2 machined into fingers 14 for pinning. FIG. 4 depicts a process of replacing a single worn steeple on the surface of a rotor 40.

In the steeple replacement process shown in FIG. 4, a first run-off tab 46 may be disposed along a first longitudinal edge of the rotor. The first run-off tab 46 is used to provide a starting area or surface for the deposition of weld metal 42. A second run-off tab 46 may be disposed along a second longitudinal edge of the rotor opposite the first run-off tab. The second run-off tab is used to provide an area or surface for stopping the deposition of weld metal 42. In this process, the metal weld 42 in deposited sequentially in beads which form rows and then columns (denoted as 1 to 11 in FIG. 4). The build-up of weld metal 42 is then machined into the shape or configuration (steeples) 44 of the replaced or repaired segment of the surface of the rotor 40. Although FIG. 4 depicts multiple steeples 44, the process can also be employed with a rotor having various numbers of steeples. Additionally, the deposition of weld beads need not take place take in the order 1–11 as indicated in FIG. 4. In further detail, the weld beads within a given layer may be applied in another sequence. However, each weld layer is typically completed before beads are welded onto another layer. For instance, the first layer weld beads 1–6 may be applied in a different order, but weld beads 1–6 will be completed before welding beads 7–11 on the second weld layer.

Figure 5:
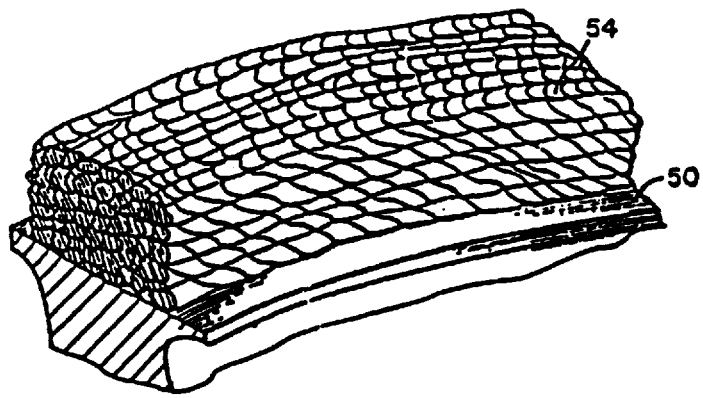
FIG. 5 (Prior Art) is a partial perspective view of a second rotor illustrating the weld build-up of FIG. 2 disposed on the surface of this rotor.

FIG. 5 depicts another process of repairing or replacing a segment of a surface of a rotor 50. In this process, weld metal is deposited continuously around the circumference of the rotor, know as a 360° repair. The build-up of weld metal 54 may be machined into individual steeples (not shown) or form a disc (not shown) which is machined down to service tolerances of the rotor. Basically, FIG. 5 illustrates the same process as that pictured in FIG. 2, but 25 the rotor in FIG. 5 is of a different shape in FIG. 5. As indicated by the Figures, this process is not limited to a rotor of a certain shape. In each of the repair processes depicted in FIGS. 1 to 5, weld metal is deposited on the surface of a rotor 20, 40, or 50 or turbine component. The process used to deposit the weld metal on the surface of the rotor is varied as a function of the metal composition of the rotor and the application or use of the repaired segment of the rotor, i.e., for LP or HP environments.

As noted above, U.S. Pat. Nos. 4,893,388, 4,897,519, 4,903,888, 4,940,390 and 4,958,431 which are assigned to the assignee of this application, teach methods of depositing weld metal on the surfaces of components comprised of ferrous CrMoV low alloy steel. The methods of depositing weld metal taught in these patents, however, are unacceptable for NiMoV low alloy steel HP steam turbine components. The methods produce unacceptable levels of hardness of the HAZ produced during the build-up of the weld metal on the surface of ferrous NiMoV low alloy steel steam turbine components.

The present invention provides a method or process of depositing weld metal on ferrous NiMoV turbine components without producing unacceptable levels of hardness about the fusion line of the HAZ produced during the build-up of the weld metal. The metal composition of ferrous NiMoV turbine components is similar to the metal composition of either ASTM 293 class 2, 3, 4, or 5 materials. A preferred embodiment of a weld metal build-up process for a ferrous NiMoV low alloy steel turbine component according to the present invention is described with reference to Table 1.

As shown in Table 1, the preferred process includes depositing fourteen layers of weld metal, numbered 1 to 14. After the deposition of the fourteenth layer, additional layers of weld metal may be deposited using most weld processes without substantially affecting the HAZ produced during the deposition of the first 14 layers of weld metal. It has been found that low levels of amperage must be used during the deposition of the first several layers of weld metal onto a ferrous NiMoV low alloy steel turbine component. In particular, during the deposition of the first layer of weld metal, denoted as 1 in Table 1, the lowest levels of amperage are used as compared to the levels of amperage used in the deposition of the remaining 13 layers, layers 2 to 14.

TABLE 1

| Layer | Primary Amps | Volts | Background Amps | Volts | IPM(CPM) Primary | Back-ground | Oscill-ation |
|---|---|---|---|---|---|---|---|
| 1 | 120 | 9.0 | 85 | 8.5 | 25(64) | 5(13) | Y |
| 2 | 150 | 9.5 | 100 | 9.0 | 20(51) | 5(13) | Y |
| 3 | 150 | 9.5 | 100 | 9.0 | 20(51) | 5(13) | Y |
| 4 | 150 | 9.5 | 100 | 9.0 | 20(51) | 5(13) | Y |
| 5 | 160/180 | 11.5 | | | 18(46) | | N |
| 6 | 190/230 | 11.5 | | | 21(53) | | N |
| 7 | 190/230 | 11.5 | | | 21(53) | | N |
| 8 | 220/260 | 11.5 | | | 24(61) | | N |
| 9 | 220/260 | 11.5 | | | 24(61) | | N |
| 10 | 290 | 12.0 | | | 26(66) | | N |
| 11 | 290 | 12.0 | | | 26(66) | | N |
| 12 | 290 | 12.0 | | | 26(66) | | N |
| 13 | 290 | 12.0 | | | 26(66) | | N |
| 14 | 290 | 12.0 | | | 26(66) | | N |

It has been found that the level of hardness of the HAZ adjacent to the fusion line is increased most dramatically during the deposition of the first layer of weld metal onto the surface of the turbine component. If the first layer of weld metal is deposited using low levels of amperage, the hardened zone can be reduced or limited. In particular, for ferrous NiMoV low alloy steel turbine components, during the deposition of the first layer of weld metal, the amperage should be about 120 amperes for a deposition rate of weld metal of about 25 inches per minute ("IPM") (64 centimeters per minute, ("CPM")).

It is also desirable to vary the deposition rate and amperage used during the deposition of the first layer of weld metal. As shown in table 1, in the preferred embodiment of the invention, the deposition rate is varied from about 5 IPM (13 CPM) with an amperage of about 85 amperes to a deposition rate of about 25 IPM (64 CPM) with an amperage of about 120 amperes. Finally, it is also desirable to oscillate the placement or position of placement of weld metal on the surface of the turbine component during the deposition of the first layer of weld metal.

It has been found that the level of hardness of metal adjacent to the fusion line of the HAZ is not usually increased during the deposition of the second and remaining layers of weld metal onto the surface of the turbine component. As a consequence, the levels of amperages used during the deposition of these layers may be higher than the levels of amperage used during the deposition of the first layer. In fact, it has been found that if higher levels of amperage are used during the deposition of the second and remaining layers, the level of hardness of areas whose level was increased during the deposition of the first layer of weld metal may be reduced, which is know as tempering.

It has also been found, however, that the level of hardness of areas whose level was not increased during the deposition of the first layer of weld metal may also be reduced if the level the amperage used during the deposition of the second and remaining levels of weld metal is too high. Reducing the level of hardness of the areas whose hardness was not increased during the deposition of the first layer of weld metal over tempers or softens these areas. Over tempering or softening an area of ferrous NiMoV low alloy steel reduces its creep strength. Thus, the levels of amperage used during the deposition of the second layer of weld metal (and subsequent layers) are selected to be high enough to temper areas of the HAZ whose level of hardness was increased by the deposition of the first layer of weld metal and selected to be not high enough to over temper areas of the HAZ whose level of hardness was not increased by the deposition of the first layer of weld metal. In particular, for ferrous NiMoV low alloy steel turbine components, during the deposition of the second layer of weld metal, the amperage should be about 150 amperes for a deposition rate of weld metal of about 20 inches per minute ("IPM") (51 centimeters per minute ("CPM")).

It is also desirable to vary the deposition rate and amperage used during the deposition of the second layer of weld metal. As shown in table 1, in the preferred embodiment, the deposition rate is varied from about 5 IPM (13 CPM) with an amperage of about 100 amperes to a deposition rate of about 20 IPM (51 CPM) with an amperage of about 150 amperes. In addition, it is also desirable to oscillate the placement or position of placement of weld metal on the surface of the turbine component during the deposition of the second layer of weld metal.

In the preferred embodiment of the invention, the deposition rate and amperage used during the deposition of the first, four layers of weld metal is varied. Table 1 depicts the deposition rates used varied during the deposition of the third and fourth layers of weld metal. In addition, the placement or position of placement of weld metal on the surface of the turbine component is oscillated during the deposition of the third and fourth layers of weld metal.

The rate of deposition of weld metal during the deposition of the fifth and remaining layers of weld metal is not varied. In addition, it is not necessary or desirable to oscillate the placement or position of placement of weld metal on the surface of the turbine component during the deposition of the fifth and remaining layers of weld metal. It is desirable, however, to vary the amperage rate during the deposition of the fifth through ninth layers of weld metal.

After the deposition of the ninth layer of weld metal, the remaining layers of the process, layers 10 to 14, are deposited using a fixed level of amperage and a fixed deposition rate of weld metal. The fixed rate of amperage is about 290 amperes and the fixed deposition rate of weld metal is about 26 IPM (66 CPM). As noted above, after the completion of the process of the present invention, i.e., the deposition of the 14 layers of weld metal, normal weld methods may be used to deposit additional weld metal to create the build-up of weld metal needed to repair or replace a segment or section of the surface of the ferrous NiMoV low alloy steel turbine component. After the build-up of weld metal is complete, the component is subjected to postweld heat treatment, such as heat treatment at a temperature of 1200° F. (649° C.) for ten hours. Thereafter, the build-up of the weld metal be machined into the shape of configuration of the replaced or repaired segment of the turbine component.

Figure 6:
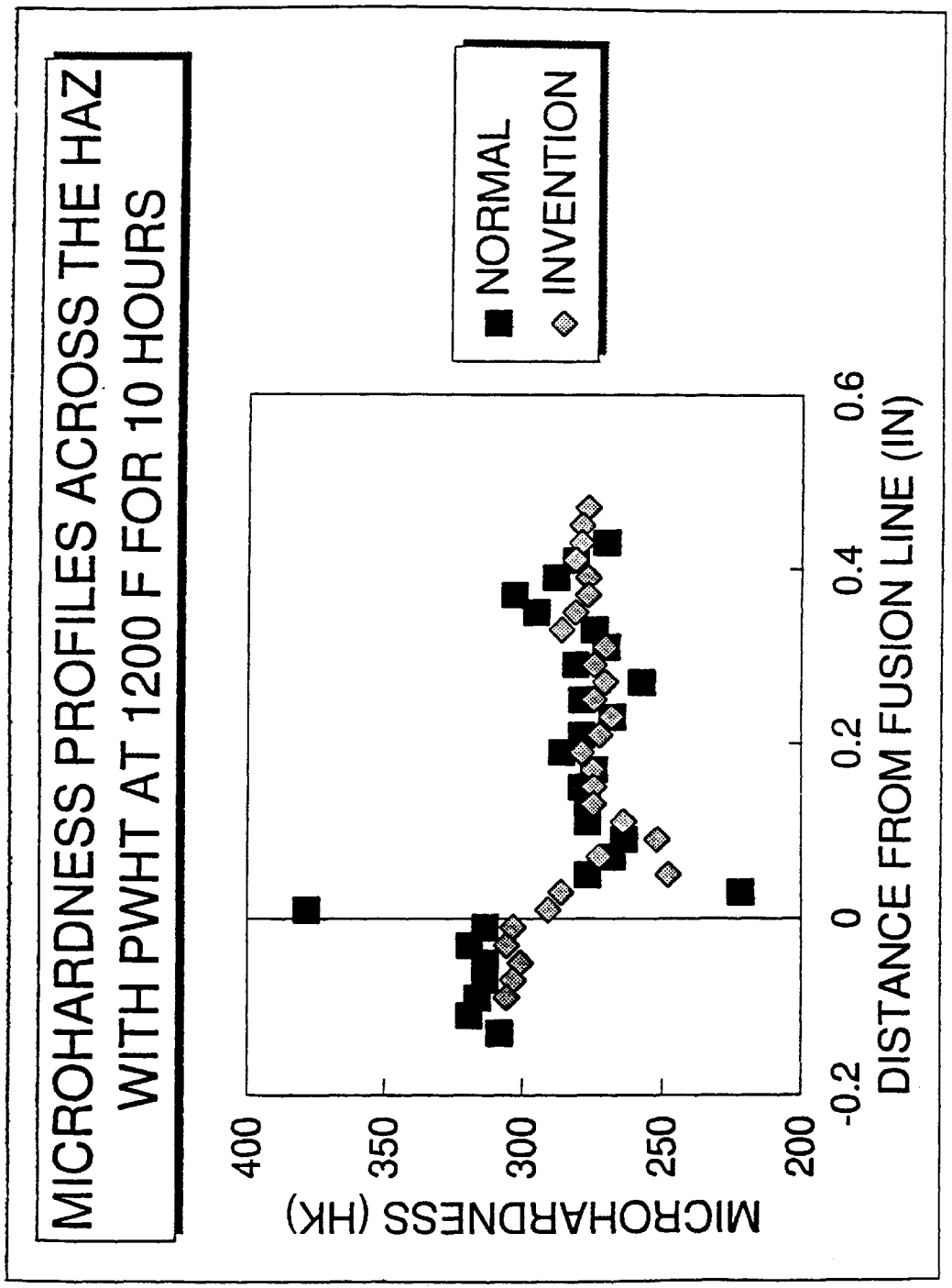
FIG. 6 is a chart delineating the level of hardness measured in areas around fusion lines of ferrous NiMoV low alloy steel turbine components repaired using a normal process and a process according to the first preferred embodiment of the present invention.

Comparisons of the levels of hardness of ferrous NiMoV low alloy steel turbine components repaired using normal welding processes and the process of the present invention are presented with reference to FIG. 6. Measurements of the microhardness of NiMoV steam turbine components at different positions about line of fusions were taken for turbine components repaired using normal welding processes and processes according to the present invention. FIG. 6 depicts the measurements plotted as a function of the distance from a fusion line and the microhardness (HK) of the metal (1 Rc is approximately equal to 10.7 (HK)).

As shown in FIG. 6, the normal welding process produces levels of hardness in a ferrous NiMoV low alloy steel turbine component which vary dramatically about the line of fusion. The measured microhardness on one side of the fusion line of the weld is about 380 HK (36 Rc) and about 220 HK (20.6 Rc) at the other side of the fusion line. First, the high level of hardness, 36 Rc, could lead to cracking. Second, the low level of hardness, 20.6 Rc, could reduce the creep strength of the ferrous NiMoV low alloy steel turbine component. Third, the large differential in hardness about the fusion line, 15.4 Rc (36–20.6 Rc), may reduce the high temperature mechanical properties of the ferrous NiMoV low alloy steel turbine component.

As also shown in FIG. 6, the welding process according to the present invention produces levels of hardness in a ferrous NiMoV low alloy steel turbine component which do not vary significantly about the line of fusion. The measured microhardness on one side of the fusion line of the weld is about 285 HK (26.6 Rc) and about 280 HK (26.2 Rc) at the other side of the fusion line. The level of hardness about the fusion line is close to the normal level of hardness (268 HK, 25 Rc) for ferrous NiMoV low alloy steel turbine components. Thus, the welding process of the present invention is not likely to lead to cracking, reduce the creep strength, or reduce the high temperature mechanical properties of a ferrous NiMoV low alloy steel turbine component.

A second preferred embodiment of this invention is described with reference to Table 2. As discussed above and as indicated in FIG. 6 by the "normal" values, conventional welding techniques can create both soft and hard spots in the HAZ. Since the soft spots are relatively more susceptible to creep stress and the hard spots are relatively more susceptible to cracking (brittle failure) it is desirable to have a HAZ that has approximately the same level of hardness throughout the entire zone. Ideally, if such a material could be achieved, it would be illustrated graphically in FIG. 6 as a relatively smooth curve through the HAZ and would not have points of relatively large deviation from the curve, maximum and minimum points. However, as indicated in FIG. 6, the "normal" process of the prior art results in a material having a soft spot of about 220 HK and a hard spot of 380 HK. This represents a drastic fluctuation of about 160 HK. In this second preferred embodiment, it has been found that the lowest level of hardness and the highest level of hardness do not differ drastically from the level of hardness of the other material in the HAZ.

As described in Table 2, this second preferred embodiment includes depositing at least 13 layers of weld material, numbered 1–13 respectfully. This method also includes selecting a level of amperes and volts for depositing each weld layer. As mentioned above, the first level of amperes/volts has a significant effect on raising the hardness of the material in the HAZ and the second level of amperes/volts has a significant tempering or softening effect on the material whose level of hardness was increased by applying the first weld layer.

TABLE 2

| Layer | Primary Amps | Volts | Background Amps | Volts | IPM(CPM) Primary | Background | Oscillation |
|---|---|---|---|---|---|---|---|
| 1 | 150 | 9.5 | 100 | 9.0 | 20(51) | 05(13) | Y |
| 2 | 250 | 11.5 | 0 | 00.0 | 24(61) | 00 | N |
| 3 | 180 | 11.5 | 0 | 00.0 | 18(46) | 00 | N |
| 4 | 180 | 11.5 | 0 | 00.0 | 18(46) | 00 | N |
| 5 | 180 | 11.5 | 0 | 00.0 | 18(46) | 00 | N |
| 6 | 220 | 11.5 | 0 | 00.0 | 21(53) | 00 | N |
| 7 | 220 | 11.5 | 0 | 00.0 | 21(53) | 00 | N |
| 8 | 220 | 11.5 | 0 | 00.0 | 21(53) | 00 | N |
| 9 | 250 | 11.5 | 0 | 00.0 | 24(61) | 00 | N |
| 10 | 250 | 11.5 | 0 | 00.0 | 24(61) | 00 | N |
| 11 | 250 | 11.5 | 0 | 00.0 | 24(61) | 00 | N |
| 12 | 285–290 | 12 | 0 | 00.0 | 26(66) | 00 | N |
| 13 | 285–290 | 12 | 0 | 00.0 | 26(66) | 00 | N |

As is evident from an inspection of Table 2, the first level of amperes/volts is selected low enough to minimize an increase in the maximum level of hardness in the HAZ and the second level of amperes/volts is selected high enough to temper the increase in the maximum value of hardness caused by depositing the first layer and to minimize the decreased in hardness at the softest point of the material. In particular, the first layer of weld material according to this embodiment is deposited at about 150 amps and 9.5 volts. As the first preferred embodiment, the level of amperes for the first level is lower than that used in applying the other layers. These values may be pulsed or decreased to about 100 amps and 9.0 volts respectfully and then back to 150 amps and 9.5 volts in a cyclic fashion. Additionally, the placement of the weld metal on the surface of the repaired component during deposition of this first layer can be oscillated. The second layer of weld material is preferably deposited at about 250 amps and 11.5 volts. In contrast to the first preferred embodiment, no oscillation is used in applying the second layer.

In addition to selecting an appropriate level of amperage and volts for depositing the first layer of weld material, a deposition rate is also selected for each layer. In this embodiment, the deposition rate for the first layer can be varied from about 20 IPM to about 5 IPM. In comparison, the deposition rate for the second layer is not varied and is maintained at about 24 IPM.

After depositing the second layer of material, the appropriate values of amperes and volts are selected for depositing layers 3–13. In particular, layer 3 is deposited at about 180 amps and 11.5 volts and the corresponding values for the remaining layers are listed in Table 2. Additionally, a deposition rate is chosen for applying each layer.

Figure 7:
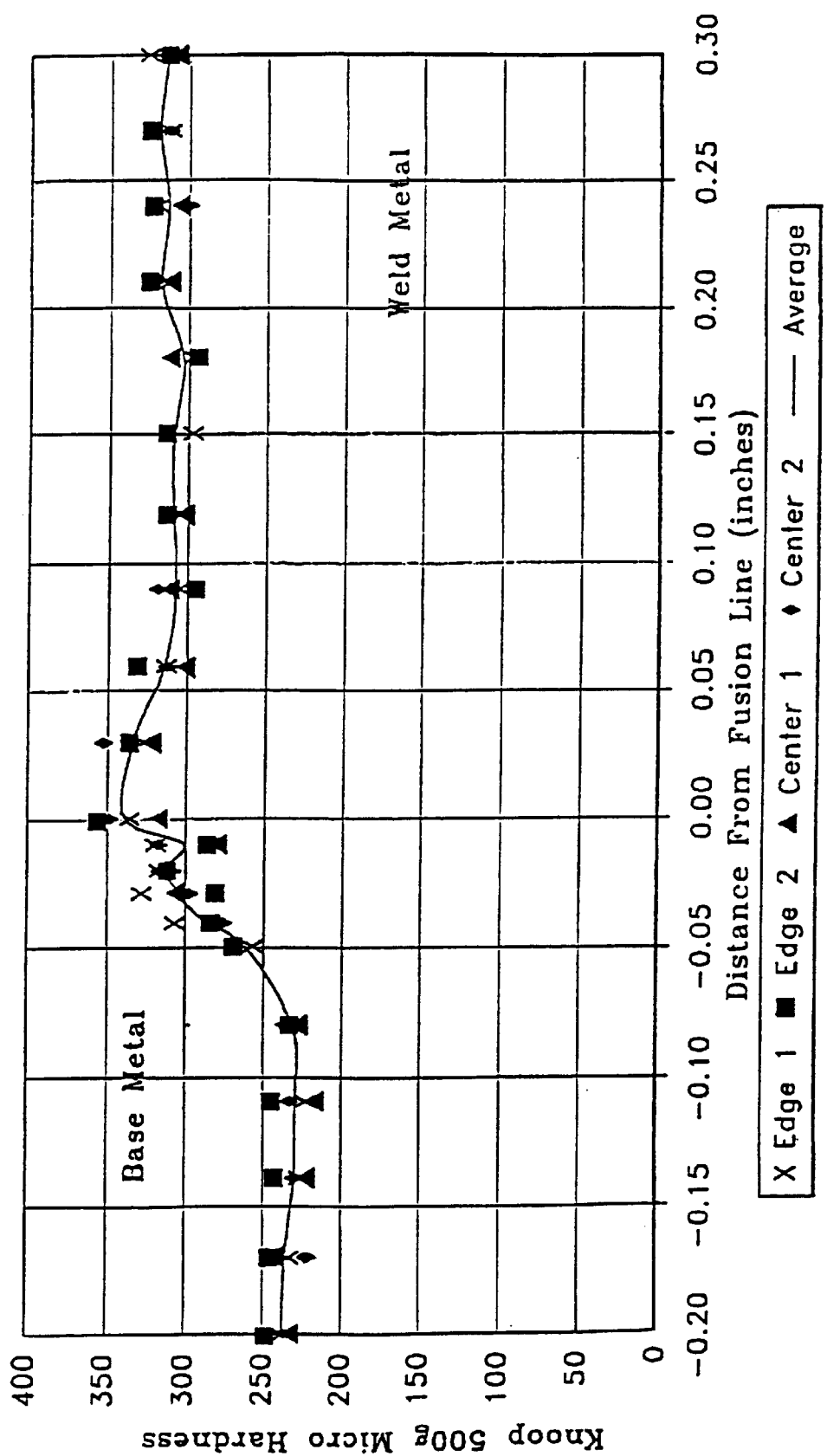
FIG. 7 is a chart delineating the level of hardness measured in areas around fusion lines of ferrous NiMoV low alloy steel turbine components repaired using a process according to a second preferred embodiment of this invention.

By selecting the appropriate level of amperages and volts for depositing the weld material in accordance with Table 2, a material with the properties in FIG. 7 is achieved. Specifically, FIG. 7 lists the hardness of such a material along four different lines. Each of the lines extends from a fusion line of the material and to the base metal, which is labeled as the negative direction and to the weld material, which is labeled as the positive direction. Two of the lines are taken through a center of the weld, center 1 and center 2, and two of the lines are taken along the edge of the material, edge 1 and edge 2. As is typical in the art, the welded material was subjected to postweld heat treatment (PWHT). In this case the treatment occurred at 1175° F.

As indicated by the smooth curve fit through the data points in FIG. 7, the fluctuations of the hardness of the material are minimized in comparison to a material welded with the normal welding process as indicated in FIG. 6. Specifically, the maximum level of hardness indicated for a material welded according to this preferred embodiment of the invention is about 353 HK and the minimum level of hardness was found to be about 280 HK. This is a drastic improvement over the prior art. As mentioned above with reference to FIG. 6, the prior art method resulted in a material with a maximum hardness of about 380 HK and a minimum hardness of about 220 HK, a fluctuation of about 160 HK. According to the preferred method, the fluctuation between the maximum and minimum levels is only about 73 HK. This represents a reduction of about 87 HK between the maximum and minimum values of hardness in the HAZ. An examination of the best fit curve through the data points in FIG. 7, indicates that the process can achieve even better results. For example, according to the best fit curve, the maximum level of hardness was about 340 HK and the minimum level of hardness was about 300 HK. This is a fluctuation of only about 40 HK which is an improvement of about 120 HK over the normal method. As a consequence, a material welded according to this preferred embodiment of this invention is relatively more likely to be resistant to creep stresses and additionally relatively less likely to fail undergo either ductile or brittle failure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A method of repairing a surface of a ferrous NiMoV low alloy metal steam turbine component, comprising the steps of:
   selecting a first level of amperage to apply a first welding layer to the surface of the component that prevents both a substantial increase and a substantial decrease in a hardness of the component;
   selecting a second level of amperage of about 250 amperes to apply a second welding layer that prevents both a substantial increase and a substantial decrease in the hardness of the component;
   welding the first layer of weld material at the first level of amperage; and
   welding the second layer of weld material at the second level of amperage.

2. The method of claim 1, wherein the steps of welding comprise gas tungsten arc welding.

3. The method of claim 1, wherein the level of amperage for each respective layer prevents a difference in hardness level between a maximum level of hardness and a minimum level of hardness from exceeding 73 HK.

4. The method of claim 1, wherein the selection of the first and the second level of amperes prevents an increase of hardness greater than about 353 HK and a decrease in hardness less than about 280 HK.

5. The method of claim 1, wherein the step of welding the first layer further comprises the steps of depositing the first layer of weld material and oscillating the first layer of weld material while it is being deposited.

6. The method of claim 1, wherein the first level of amperage comprises a range of amperage from about 150 amperes to about 100 amperes.

7. The method of claim 1, further comprising the steps of determining a first deposition rate for depositing the first layer of weld material that prevents both a substantial increase and a substantial decrease in the hardness of the component and welding the first layer of weld material at that deposition rate.

8. The method of claim 7, wherein the first deposition rate comprises a range between a minimum and a maximum first deposition rate.

9. The method of claim 1, further comprising the steps of selecting a third through thirteenth level of amperes for depositing a respective third through thirteenth layer of weld material and welding the third through thirteenth layers of weld material at the respective selected level of amperage.

10. The method of claim 9, wherein the third level of amperage is less than the second level of amperage.

11. The method of claim 9, wherein the sixth level of amperage is greater than the third level of amperage.

12. The method of claim 9, further comprising the steps of determining a second through thirteenth deposition rate for depositing each respective layer of weld material that prevents both a substantial increase and a substantial decrease in the hardness of the component and welding each respective layer of weld material at that deposition rate.

13. The method of claim 9, wherein the steps of welding comprise gas tungsten arc welding.

14. A method of repairing a surface of a ferrous NiMoV low alloy metal steam turbine component, comprising the steps of:
   selecting a first level of amperage of about 150 amperes to apply a first welding layer to the surface of the component that minimizes a difference between a maximum level of hardness and a minimum level of hardness of the component in a heat effected zone;
   selecting a second level of amperage of about 250 amperes to apply a second welding layer that minimizes the difference between the maximum level of hardness and the minimum level of hardness of the component in the heat effected zone;
   welding the first layer of weld material at the first level of amperage; and
   welding the second layer of weld material at the second level of amperage.

15. The method of claim 14, wherein the steps of welding comprise gas tungsten arc welding.

16. The method of claim 14, wherein the maximum level of hardness is about 353 HK and the minimum level of hardness is about 280 HK.

17. The method of claim 14, wherein the step of welding the first layer further comprises the steps of depositing the first layer of weld material and oscillating the first layer of weld material while it is being deposited.

18. The method of claim 14, wherein the difference between the maximum and minimum levels of hardness is less than about 73 HK.

19. A method of repairing a surface of a ferrous NiMoV low alloy metal steam turbine component, comprising the steps of:

selecting a first level of amperage of about 150 amperes to apply a first welding layer to the surface of the component that prevents a substantial decrease in a minimum level of hardness of the component in a heat effected zone;

selecting a second level of amperage of about 250 amperes to apply a second welding layer that prevents a substantial decrease in the minimum level of hardness of the component in the heat effected zone;

welding the first layer of weld material at the first level of amperage; and welding the second layer of weld material at the second level of amperage.

20. A method of claim 19, wherein the minimum level of hardness is 280 HK.

* * * * *